US006427948B1

(12) United States Patent
Campbell

(10) Patent No.: US 6,427,948 B1
(45) Date of Patent: Aug. 6, 2002

(54) CONTROLLABLE VORTEX GENERATOR

(76) Inventor: Michael Campbell, 9744 15th Ave. Northwest, Seattle, WA (US) 98117

( * ) Notice: Subject to any disclaimer, the term of this patent is extended or adjusted under 35 U.S.C. 154(b) by 0 days.

(21) Appl. No.: 09/702,373

(22) Filed: Oct. 30, 2000

(51) Int. Cl.[7] ................................................ B64C 23/06
(52) U.S. Cl. ........................ 244/199; 244/204; 244/130
(58) Field of Search ................................ 244/198, 199, 244/200, 201, 203, 204, 75 R, 130

(56) References Cited

U.S. PATENT DOCUMENTS

| | | | | |
|---|---|---|---|---|
| 2,740,596 A | | 4/1956 | Lee | |
| 2,764,373 A | | 9/1956 | Anderson et al. | |
| 2,846,165 A | | 8/1958 | Axelson | |
| 4,039,161 A | | 8/1977 | Bauer | |
| 4,429,843 A | | 2/1984 | Thompson | |
| 4,697,769 A | | 10/1987 | Blackwelder et al. | |
| 4,836,473 A | | 6/1989 | Aulehla et al. | |
| 5,058,837 A | | 10/1991 | Wheeler | |
| 5,253,828 A | | 10/1993 | Cox | |
| 5,282,591 A | | 2/1994 | Walters et al. | |
| 5,492,289 A | | 2/1996 | Nosenchuck et al. | |
| 5,634,613 A | | 6/1997 | McCarthy | |
| 5,662,294 A | * | 9/1997 | Maclean et al. | 244/219 |
| 5,752,672 A | * | 5/1998 | McKillip, Jr. | 244/75 R |
| 6,065,934 A | * | 5/2000 | Jacot et al. | 416/155 |
| 6,220,550 B1 | * | 4/2001 | McKillip, Jr. | 244/215 |

OTHER PUBLICATIONS

Paper by Darel E. Hodgson, Ph.D., "Using Shape Memory Alloys", Shape Memoruy Applications. Inc., Sunnvale, California, 1988 (Applicant does not know whether this application has been published).

* cited by examiner

*Primary Examiner*—Peter M. Poon
*Assistant Examiner*—Timothy D. Collins
(74) *Attorney, Agent, or Firm*—Richardson & Folise

(57) ABSTRACT

A controllable vortex generator for reducing aerodynamic drag when vortex generation is not desired. The vortex generator includes a fin having a fixed forward portion and an aft portion which is movable between deflected and undeflected positions. At least a portion of the fin is formed of a memory shape alloy. The fin is attached to a base mountable to a surface such as the wing skin of an aircraft. An electrical resistance heating element is bonded to the fin and a controllable source of electric power is connected to the element. When the fin is heated by the element to a temperature equal to or greater than the transformation temperature of the alloy, the movable portion of the fin will move from a deflected position to an undeflected position, thereby reducing drag caused by the vortex generator.

16 Claims, 4 Drawing Sheets

VERTICAL/ UP
FORWARD
AFT
DOWN
32 12 36 14 20 22 30 34 38 16 24 42 50 44 46 40

HEAT OFF
10
32
22
20
30
24
40
12
34
46
44

HEAT ON
32
10
22
20
30
40
24
12
34
46
44

10
40
12
32
34
20
44
46

48
12
30
16
34
50
32
14
20
44
46
40
10

104
100
102
116
108
120
106
114
124
122
112
110

100

104
120
108
102
122
110
122
114
112

CONTROLLABLE VORTEX GENERATOR

TECHNICAL FIELD

This invention generally relates to fluid flow control devices and more particularly to a controllable vortex generator for use on surfaces over which a fluid may flow such as the wing surfaces of an aircraft.

BACKGROUND OF THE INVENTION

It is well known to attach an array of vortex generators to an aerodynamic surface of an aircraft to energize the downstream boundary layer and thereby reduce the tendency of airflow to separate from the surface under adverse pressure conditions. Flow separation on the upper surface of the wings of an aircraft is particularly undesirable in that it may result in the loss of lift and control. As a general rule, these problems arise only when the aircraft is operating at relatively slow speeds and at high angles of attack such as during approach and takeoff. During cruising flight, vortex generators are generally unnecessary and simply create additional drag.

Previous attempts have been made to minimize or eliminate the unnecessary drag produced by fixed-vane type vortex generators during cruising flight. For example, U.S. Pat. No. 5,253,828 discloses an array of vortex generators which are mounted to the leading edge of a wing flap. When the flap is retracted, the vortex generators are retracted within a panel covering the gap between the wing and the flaps. When the flap is deflected, the vortex generators are extended through slots in the panel into the airstream. Also, U.S. Pat. No. 4,039,161 discloses a somewhat similar invention in which pairs of opposing vortex generators are mounted within a wing structure just beneath the upper and lower surfaces, respectively, of the wing skin. The vortex generators, which are biased toward retracted positions by a pair of springs, are mechanically interconnected with an associated flap. When the flap is deflected upward, the lower vortex generator is extended downward into the air stream, and vice versa.

While both of these systems may be effective in reducing the cruise drag penalty associated with vortex generators, they have certain inherent disadvantages. First, because they introduce additional mechanical components into the aircraft, they inherently increase weight, as well as manufacturing and maintenance costs which may not be offset by the resulting fuel savings. Secondly, they might under some circumstances give rise to safety of flight problems. A failure in their mechanical systems could result in loss of lift or control under critical flight conditions and could interfere with operation of the associated control surfaces.

Accordingly, it is an object of this invention to provide for a controllable vortex generator which can be selectively moved between a deflected position where it will produce downstream turbulence and an undeflected position where associated drag will be minimized.

It is another object of this invention to produce such a vortex generator which can be manufactured and installed on an aircraft at a cost comparable to that of a conventional fixed-vane type vortex generator.

It is a further object of this invention to provide for a controllable vortex generator which is electrically operated and which would, upon failure of any part of the associated electrical system, return to the deflected system so as to eliminate any safety of flight problem.

SUMMARY OF THE INVENTION

This invention can be broadly summarized as providing for a controllable vortex generator which includes a fin and means for mounting the fin to a surface over which a fluid may flow such as the surface of an airplane wing. At least a portion of the fin is formed of a shape memory alloy and the invention also includes means for heating that portion.

According to a more detailed aspect of the invention, the fin includes a forward portion fixed with respect to the surface and an aft portion which is movable with respect to the forward portion.

According to another detailed aspect of the invention, the shape memory alloy consists essentially of nickel and titanium.

According to a yet more detailed aspect of the invention, the heating means includes an electrical resistance heating element mounted on the fin.

The invention can also be summarized as providing for a controllable vortex generator having deflected and undeflected positions. The vortex generator includes a fin, a portion of which is formed of a shape memory alloy, means for heating that portion, and means for mounting the fin to a surface over which a fluid may flow. It further includes means attached to the fin for biasing it toward the deflected position.

According to a more detailed aspect of the invention, the means for biasing is a spring. According to a yet more detailed aspect of the invention, the means for biasing is a leaf spring slidably mounted to the fin.

DETAILED DESCRIPTION OF THE PREFERRED EMBODIMENTS

The novel features believed to be characteristic of this invention are set forth in the appended claims. The invention itself, however, may be best understood and its various objects and advantages best appreciated by reference to the detailed description below in connection with the accompanying drawings.

Figure 1:
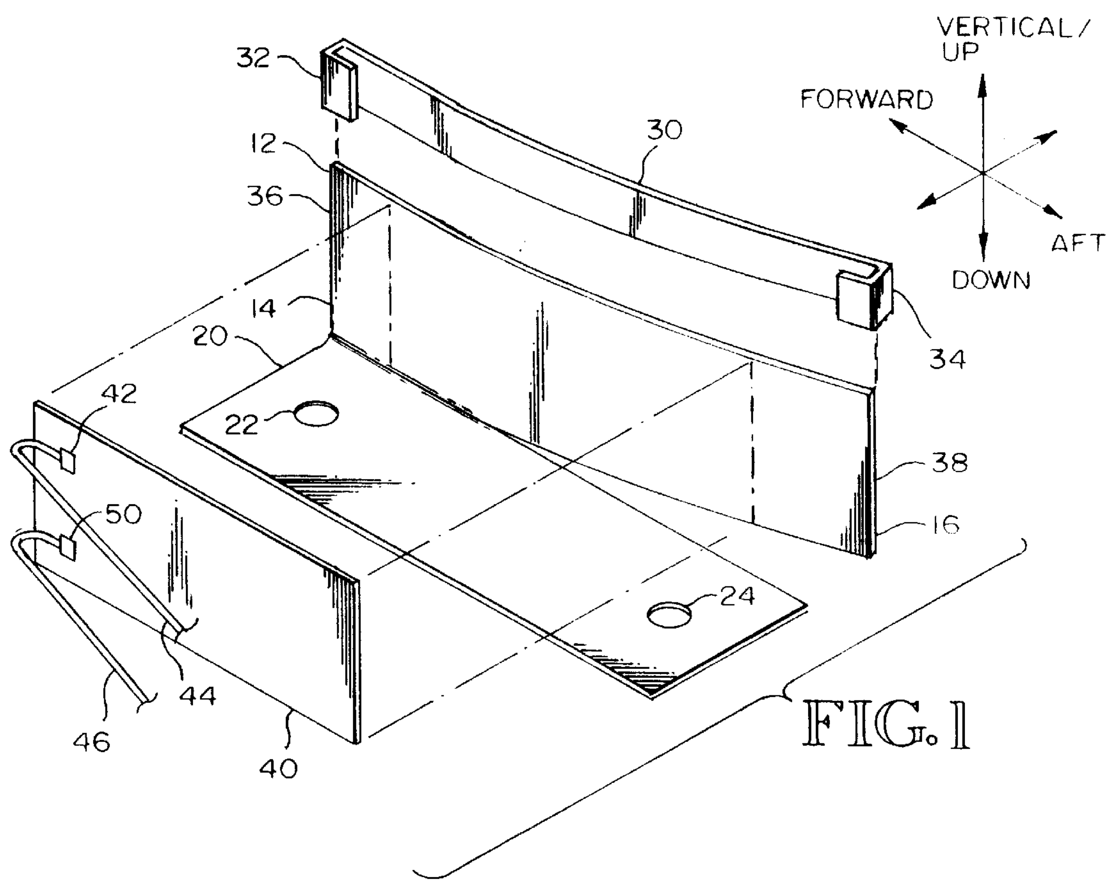
FIG. 1 is an exploded perspective view of a controllable vortex generator constructed in accordance with the present invention.
Figure 3:
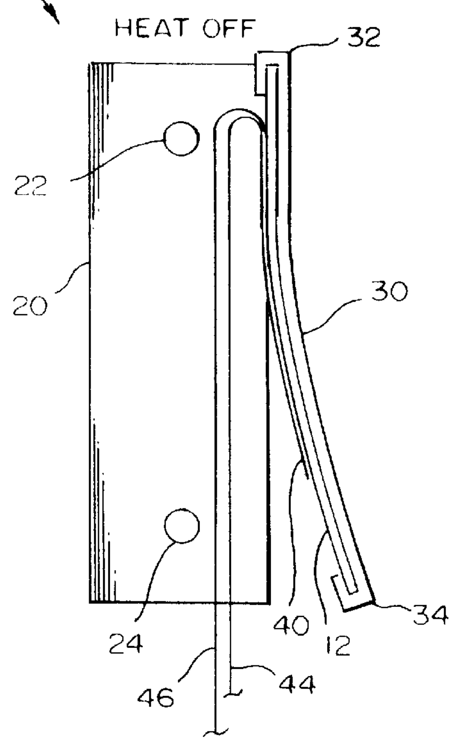
FIG. 3 is a top view of the same embodiment showing the aft portion of the fin in the deflected position.
Figure 2:
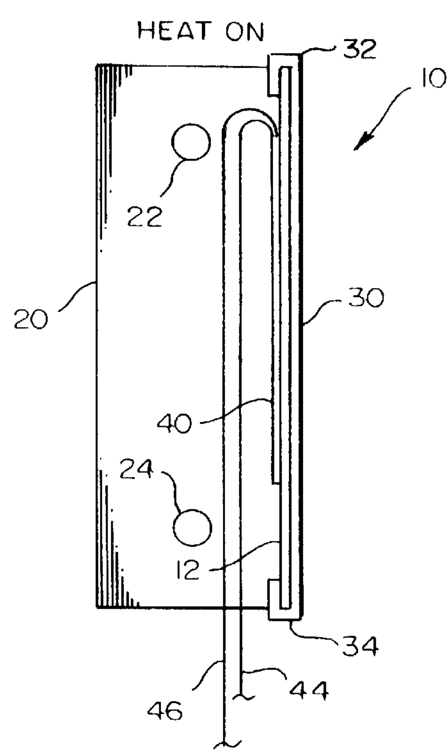
FIG. 2 is a top view of the vortex generator of FIG. 1 showing the aft portion of a fin in the undeflected position.
Figure 4:
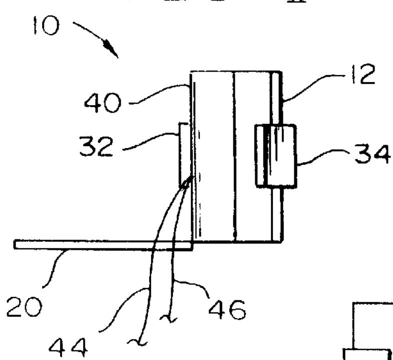
FIGS. 4 and 5 are rear and left side views, respectively, of the embodiment of FIG. 3.
Figure 5:
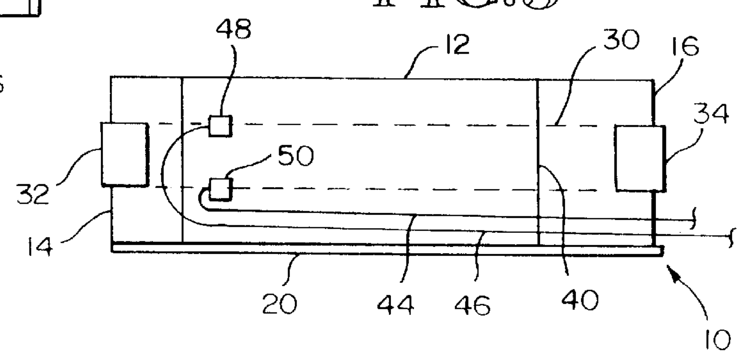

In FIGS. 1 through 6 of those drawings, a controllable vortex generator constructed in accordance with the teachings of the present invention is illustrated and generally designated by the number 10. The vortex generator includes vertically oriented fin 12 having a forward portion 14 and an aft portion 16. The forward portion of the fin is joined to and fixed with respect to base 20, whereas the aft portion is free to be deflected laterally with respect to the base. The vortex generator may be mounted on a desired surface either by bonding the base to it with an appropriate adhesive or by mounting it to the surface with fasteners through holes 22 and 24. Leaf spring 30, which is preferably made of spring steel, includes U-shaped clips 32 and 34 which are formed in its forward and aft ends, respectively. Spring 30 is formed so that it assumes an arcuate shape as shown in FIG. 1 when it is not subjected to any loads. Spring 30 is installed on fin 12 by slidably engaging clips 32 and 34 over forward end 36 and aft end 38 of the fin as shown in FIG. 3. When installed on the fin, the spring will urge aft portion 16 of the fin to bend into the deflected position shown in that figure.

Vortex generator 10 also includes electrical resistance heating element 40, the details of which are well known to those of ordinary skill in the art. The heating element is preferably bonded to surface 42 of the fin with an appropriate adhesive. As shown in FIG. 1 power is supplied to the heating element through insulated conductors 44 and 46 which are soldered to the element at contacts 48 and 50, respectively.

The material from which fin 12 is formed is a significant aspect of this invention. In particular it is formed of an alloy known as a "shape memory" alloy. It is known to those of ordinary skill in the metallurgical arts that certain alloys exhibit a phenomena known as "shape memory". An object formed of such an alloy which has been deformed, even well beyond its elastic range, can be returned to its original shape by heating the object. The temperature necessary to cause the alloy to "remember" its original shape is selected at the time of alloy manufacture.

All alloys which exhibit shape memory undergo a change in the crystalline form, or a phase change, as they are cooled or heated through a temperature referred to as their transformation temperature (TTR). The particular type of transformation which occurs in shape memory alloys, known as a martensitic transformation, changes the alloy from a high temperature form referred to as austenite to a low temperature form referred to martensite. For a particular alloy in a particular annealed conditioned, this transformation will occur at a predictable and repeatable temperature. The reason that the transformation occurs is because at that particular temperature one phase or the other of the alloy is more thermodynamically stable. An interesting aspect of the transformation is that it can occur virtually instantaneously at the point that the transformation temperature is reached. Another interesting and useful aspect of shape memory alloys is that the force necessary to deform them when they are in their martensitic state below their transformation temperature is much less than the force that the alloy can exert when it attempts to return to its original shape upon being heated to a temperature equal to or greater than the transformation temperature.

While a number of alloys are known to exhibit shape memory, the one which has been employed in most commercial applications is an alloy of nickel and titanium typically having about 50% of each element. Such an alloy is preferably used to form fin 12. The fin is initially fabricated in the shape illustrated in FIG. 2 where the forward and aft portions of the fin are essentially aligned in the forward and aft position. It is this position which is the desired "memory" or original shape of the fin. As is well known, the memory shape is imparted to the alloy by a carefully controlled heat treatment process in which it is annealed at a temperature ranging from 400 to above 550 degrees centigrade. Next the fin is deformed sufficiently to permit the installation of spring 30. That spring, being arcuate in shape, will force the fin to assume the deflected position shown in FIG. 3. The wattage of heating element 40 is selected such that when connected to available power it will heat fin 12 to a temperature at or above the transformation temperature of the alloy under all anticipated operating ambient temperatures for the aircraft on which it is to be installed.

Figure 6:
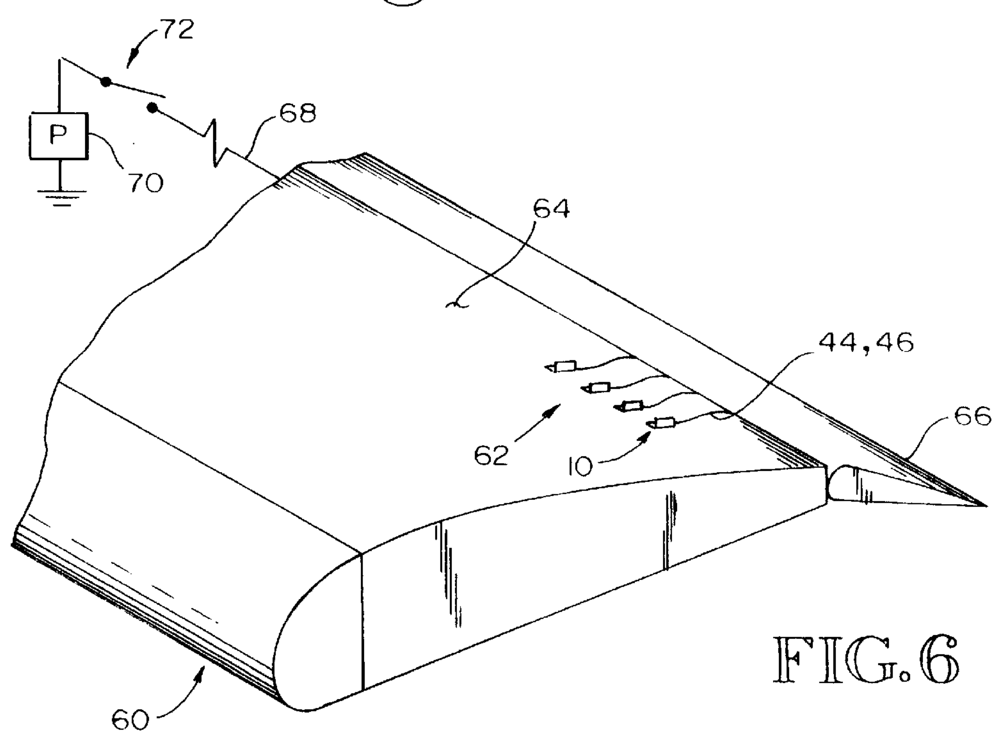
FIG. 6 is a perspective view showing an array of controllable vortex generators according to the present invention in a typical installation on an aircraft wing.

Referring to FIG. 6 which illustrates a portion of a typical aircraft wing section 60, an array 62 of vortex generators such as vortex generator 10 had been installed on upper wing surface 64 just upstream of flap 66. A pair of insulated conductors such as conductors 44 and 46 extend aft from each of the vortex generators into the area of the rear spar (not shown) where they are joined to two cable conductor 68. Power is supplied to each of the heating elements by power source 70 which is connected through control switch 72 to cable 68. The control switch may be manually operated by the crew or automatically controlled by movement of flap 66.

As power is supplied to heating element 40, it will begin to heat fin 12. When the temperature of fin 12 reaches the transformation temperature, the aft portion of the fin will return to its memory shape, or the undeflected position shown in FIG. 2. So long as the aft portion of the fin is retained at or above the transformation temperature, the fin will remain in that position. Should power be disconnected from element 40, either by the opening of switch 72 or possibly by an electrical failure in the system, the fin will begin to cool. At the point where it reaches the transformation temperature of the alloy, the fin will again revert to the deflected position shown in FIG. 3. Thus it can be seen that the invention incorporates a fail-safe feature; that is, in the event power is lost for any reason to the vortex generators they will automatically return to the deflected position where they will continually act to produce downstream turbulence and retard flow separation.

Figure 7:
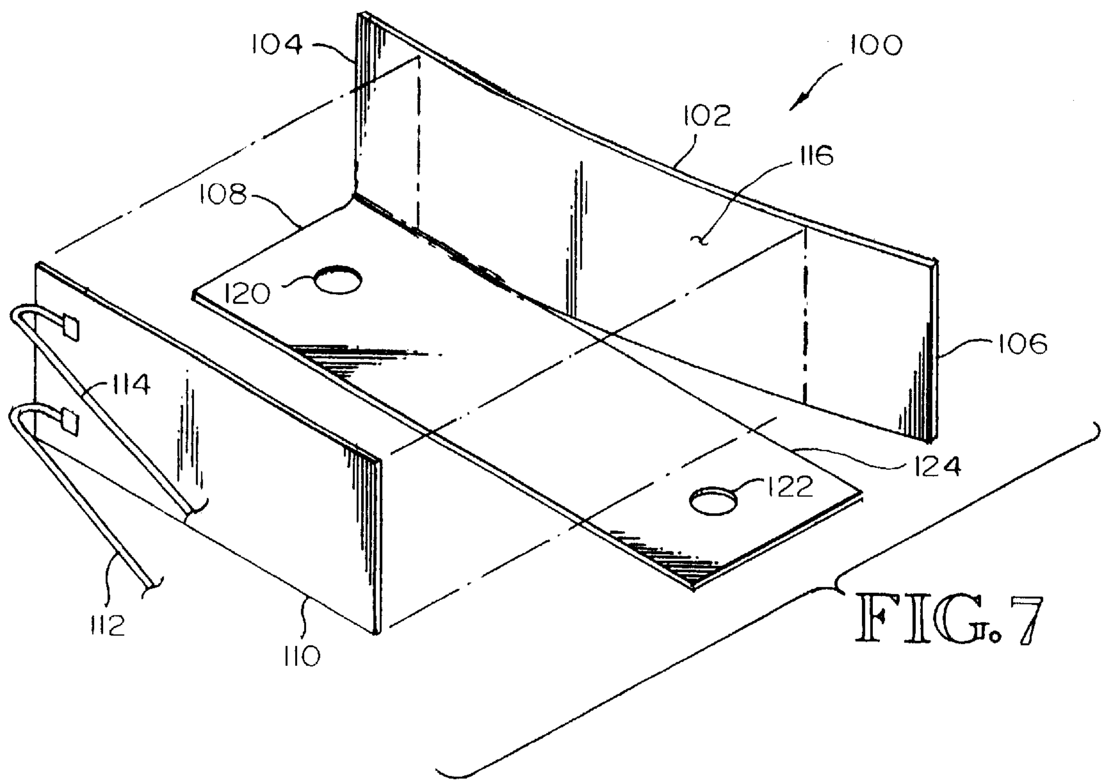
FIG. 7 is an exploded perspective view of a second embodiment of the present invention.
Figure 8:
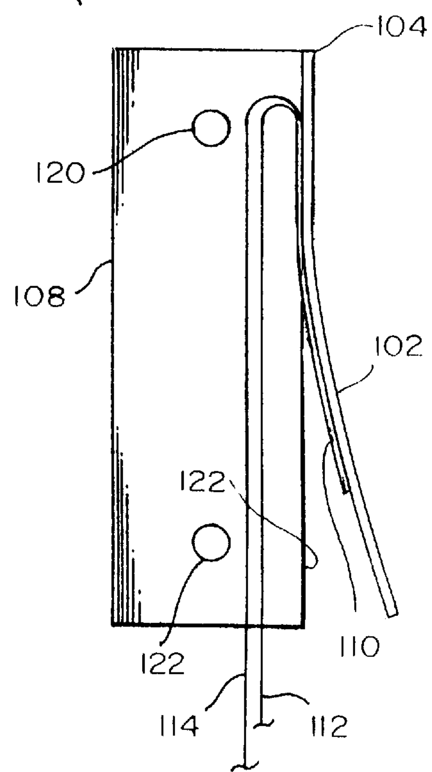
FIG. 8 is a top view of the embodiment of FIG. 7.

FIG. 7 and 8 illustrate a second embodiment of the present invention which is generally designated by the number 100. This embodiment differs from the one described above principally in that it does not include a spring element similar to spring 30. Referring to FIG. 7, this embodiment includes fin 102, which includes forward portion 104 and aft portion 106. Forward portion 104 is attached to and fixed with respect to base 108. As with the first embodiment, the fin and the base are formed of a shape memory alloy, preferably an alloy of nickel and titanium. This embodiment further includes resistance heating element 110 which is similar to heating element 40, described above. Power is controllably provided to the heating element through insulated conductors 112 and 114 from a power source such as source 70. Heating element 110 is bonded to surface 112 of fin 102 with an appropriate adhesive. The vortex generator may be attached to a surface such as wing surface 64 by bonding or by means of fasteners inserted into surface 64 through holes 120 and 122.

Another significant difference between this embodiment is the manner in which fin 102 is placed in the deflected position (as shown in FIG. 7). In the first embodiment fin 12 is forced into the deflected position by spring 30, whereas in this embodiment aft portion 106 is purposefully deformed or bent into the deflected position during fabrication. During operation, when it is heated to a temperature equal to or greater than the transformation temperature of the shape memory alloy the aft portion will tend to return to a position of alignment with forward portion 104 and with edge 124 of the base. Because the aft portion is not required to work against an imposed stress as it moves toward the undeflected position, its recovery is referred to as a "free recovery".

Figure 9:
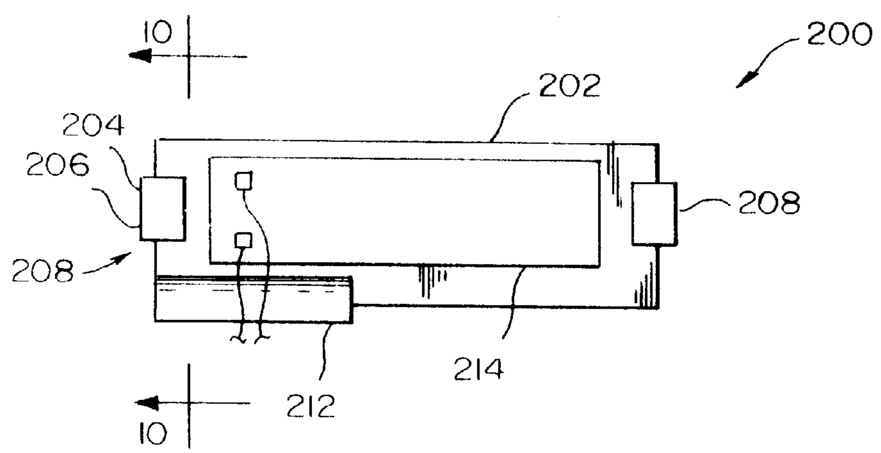
FIG. 9 is a side view of a third embodiment of the present invention.
Figure 10:
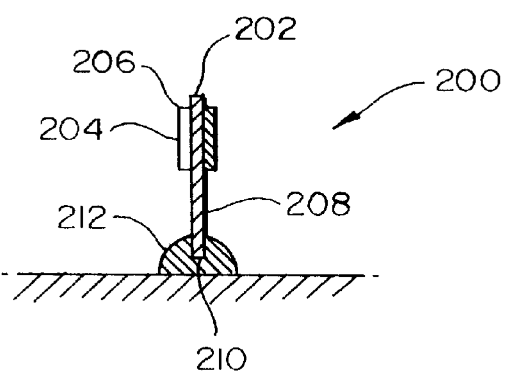
FIG. 10 is a sectional view taken at 10—10 of FIG. 9.

FIGS. 9 and 10 illustrate a third embodiment of the present invention designated by the number 200. This embodiment includes fin 202 which is preferably formed a shape memory alloy of nickel and titanium and which is similar in shape to fin 12 of the first embodiment. It also includes curved leaf spring 204 which has U-shaped clips 206 and 208 formed in its forward and aft ends, respectively. The spring is mounted on fin 202 by slidably engaging the clips with the forward and aft edges of the fin. Forward portion 208 of the fin is securely mounted with an adhesive in slot 210 formed in base 212. The base is coextensive only with the forward portion of the fin so that the aft portion is free to move between a deflected and an undeflected position. This embodiment also includes heating element 214 which is similar to element 40 and which is controllably powered in the same manner as shown in the first embodiment. As with the other embodiments, vortex generator 200 is mountable on a surface such a wing skin 64 with an adhesive or mechanical fasteners.

As can be seen, the principle difference between this embodiment and the first two described above is that fin 202 and base 212 are separately fabricated and then assembled. One advantage of this construction is that only the fin need be formed of a shape memory alloy. Another advantage is that in the event the fin is damaged during operation it can simply be removed from the base and replaced without necessitating removal of the base from the wing skin.

Thus, it can be seen that the present invention provides for a controllable vortex generator which incorporates many novel features and offers significant advantages over the prior art. Although only three embodiments of this invention have been illustrated and described, it is to be understood that obvious modifications can be made of it without departing from the true scope and spirit of the invention. For example, it would be obvious to construct the fin so that only the aft portion is formed from a shape memory alloy and the forward or fixed portion is formed of some other material.

I claim:

1. A controllable vortex generator comprising:

a fin, at least a portion of which is formed of a shape memory alloy, wherein the fin includes a fixed forward section and an aft section which is movable with respect to the forward portion;

means for heating the portion; and means for mounting the fin in an upwardly projecting orientation with respect to a surface over which a fluid may flow.

2. The vortex generator of claim 1 wherein the shape memory alloy includes nickel and titanium.

3. The vortex generator of claim 1 wherein the means for mounting includes a base mountable on the surface and wherein the fin is mounted to the base.

4. The vortex generator of claim 2 wherein the shape memory alloy consists essentially of nickel and titanium.

5. The vortex generator of claim 1 wherein the means for heating is attached to the fin.

6. The vortex generator of claim 5 wherein the means for heating includes an electrical resistance heating element mounted on the fin.

7. The vortex generator of claim 1 wherein the means for heating is capable of elevating the temperature of the portion to the transition temperature of the alloy.

8. A controllable vortex generator having a deflected position and an undeflected position, the vortex generator comprising:

a fin, at least a portion of which is formed of a shape memory alloy, wherein the fin includes a fixed forward section and an aft section which is movable with respect to the forward section;

means for heating the portion;

means for mounting the fin in an upwardly projecting orientation with respect to a surface over which a fluid may flow; and means attached to the fin for biasing the fin toward the deflected position.

9. The vortex generator of claim 8 wherein the shape memory alloy includes nickel and titanium.

10. The vortex generator of claim 9 wherein the shape memory alloy consists essentially of nickel and titanium.

11. The vortex generator of claim 8 wherein the means for heating is attached to the fin.

12. The vortex generator of claim 11 wherein the means for heating includes an electrical resistance heating element mounted on the fin.

13. The vortex generator of claim 8 wherein the means for heating is capable of elevating the temperature of the portion to the transistion temperature of the alloy.

14. The vortex generator of claim 8 wherein the means for biasing is attached to the fin.

15. The vortex generator of claim 8 wherein the means for biasing is a leaf spring slidably mounted to the fin.

16. A controllable vortex generator having a deflected position and an undeflected position, the vortex generator comprising:

a fin, at least a portion of which is formed of a shape memory alloy;

means for heating the portion;

means for mounting the fin in an upwardly projecting orientation with respect to a surface over which a fluid may flow; and a spring attached to the fin for biasing the fin toward the deflected position.

* * * * *